Patented Jan. 15, 1929.

1,699,355

UNITED STATES PATENT OFFICE.

GRANT HAMMOND, OF NEW HAVEN, CONNECTICUT, ASSIGNOR TO FUEL DEVELOPMENT CORPORATION, OF WILMINGTON, DELAWARE, A CORPORATION OF DELAWARE.

FUEL AND PROCESS OF MAKING THE SAME.

No Drawing.   Application filed August 6, 1925. Serial No. 43,589.

My invention relates particularly to fuels utilizing fluid or liquid saturated hydrocarbons of the homologous series, particularly such hydrocarbons as kerosene and gasoline, the object of my invention being to add to these or similar fluids a substance which will prevent what is known as "knocking" when used in an internal combustion engine or similar prime movers, and more particularly in automobile engines. A further object of my invention is to produce a fuel which will minimize and practically prevent the formation of carbon in an internal combustion engine without any deleterious effects on the surfaces of the piston and cylinder.

Heretofore, many attempts have been made to produce a fuel having the advantages set forth. It has been proposed to cause commercial alcohol to mix with hydrocarbons by dehydrating the alcohol through the use of calcium oxide and also through the use of calcium carbide either prior to or at the same time that the alcohol and hydrocarbons are mixed together. Processes of this type, however, are expensive and result in residuums being retained in the mixtures, particularly acetylene, in the case where calcium carbide is used.

It has also been proposed to use as ingredients mixed with liquid hydrocarbon, iodine, tetraethyl lead, aniline and various other chemicals. However, these have been found to be unsatisfactory because they produce effects which render them undesirable. Such effects include chemical actions on the surface of the cylinder walls, pistons and valves, bad odors and obnoxious gases issuing from the exhausts of internal combustion engines. Such proposed compounds also usually contain or involve ingredients which materially increase the cost of the fuel finally produced.

I have found that when anhydrous ethyl alcohol is mixed with liquid hydrocarbons so that it is completely blended therewith, the disadvantages above mentioned are entirely eliminated, and, furthermore, the compression may be greatly increased prior to the explosion of the mixture in an internal combustion engine.

Heretofore, one difficulty in using anhydrous ethyl alcohol has resided in the difficulty and expense of eliminating the water content from the commercial forms of ethyl alcohol, which usually are about 190° to 195° proof, and which therefore contain from 5% to 2½% of water. This water content obviously constitutes an ingredient which prevents blending of the alcohol with the hydrocarbons into which the alcohol is introduced, and has been a source of much trouble in efforts to form such mixtures.

I have discovered a method by which ethyl alcohol of from 185° to 195° proof or even more diluted alcohol may be used in gasoline, in kerosene, or mixtures of gasoline and kerosene, without retaining the disadvantages of the presence of water. My improved process for producing this result may be described as follows:

I preferably mix commercial ethyl alcohol with a liquid hydrocarbon such as gasoline and other hydrocarbons which are miscible therewith and cause the alcohol to blend therewith so that it does not separate therefrom under conditions of temperature and pressure to which the same may be subjected under normal use.

For this purpose I introduce into a closed retort or autoclave approximately 95% of commercial gasoline and 4 to 7% of commercial ethyl alcohol. The retort should not be completely filled with the mixture but should have a vacant space above the liquid amounting to ¼ or ⅓ of the volume of the retort. The retort is closed and subjected to a heat by means of steam jackets or pipes or other suitable heating means so that the pressure is raised therein to about 25 pounds per square inch corresponding to a temperature of about 145° F. This pressure is not at all critical but may be varied from 10 to 35 or 40 pounds pressure and corresponding to about 180° F. without materially changing the effect on the ingredients introduced. The pressure on the contents of the retort is maintained for a short time, preferably from one-half an hour to an hour, and then the retort and contents are allowed to cool to normal atmospheric temperature and pressure. The mixture of alcohol and hydrocarbon thus obtained is decanted, leaving as a residue at the bottom of the retort, the water that has been separated from the alcohol. This water may contain a slight amount of alcohol which has not been absorbed by the hydrocarbon, but in the course of my experiments I have found that water contains but a slight amount of the alcohol which was originally introduced.

As a result of the above process I have found that the alcohol has been completely absorbed by the hydrocarbon and a homogeneous solution of the hydrocarbon and the alcohol is formed so that the same will remain as a stable solution and will not separate under normal atmospheric conditions.

I am not aware of the definite chemical or physical principles upon which the action above described is based. It may be that the lighter hydrocarbons and the alcohol evaporate from the surface of the mixture and the alcohol being anhydrous, immediately mixes with the hydrocarbon vapors, the molecules of which when so associated are re-absorbed by the hydrocarbon after which more alcohol and hydrocarbon are evaporated, combined and absorbed by the mixture. This process may take place until substantially all of the alcohol has been combined with hydrocarbon vapors and absorbed in the liquid hydrocarbon, particularly since it appears that the molecules of alcohol have a greater affinity for the molecules of hydrocarbon than they do for the molecules of water at the temperatures and pressures mentioned.

It will thus be appreciated that I have produced a hydrocarbon fuel without the use of other ingredients than those involved in the mixture itself, and by a process which is extremely simple and one which may be rapidly and economically carried out. It will be apparent that the process may be used in connection with any of the lighter hydrocarbons, such as benzol and benzine, as well as with commercial gasoline, which it will be appreciated at the present day, contains a considerable percentage of kerosene.

It will also be apparent that kerosene may also be added to the mixture thereby reducing the first cost of the raw materials. It will also be apparent that other alcohols, such as methyl alcohol, which also mixes with water, may be used in the fuel and mixed with hydrocarbons as above pointed out.

I have found that the lighter hydrocarbons, such as gasoline, and ethyl alcohol, blended by the above process, makes a very superior fuel. It is water-white and is perfectly clear as gasoline itself. It produces a mixture of very low viscosity as may be easily determined by shaking a bottle of the mixture so as to produce a foam or froth which is very rapidly dissipated. When my improved fuel is used in internal combustion engines, such as automobile engines, there is no tendency to produce "knocking" and I have found, as a matter of fact, that the knocking has been eliminated in an engine which has previously become badly fouled with deposits of carbon. The formation of carbon deposits in an engine in which my improved fuel is used, is completely prevented.

In using the term "hydrocarbons" I wish it to be understood that liquid hydrocarbons of the unsaturated or ring series, such as benzole and benzine, are contemplated as well as those of the paraffin series or homologous series.

Having thus described the manner of carrying out my improved process and the fuels resulting therefrom, what I claim and desire to protect by Letters Patent is:

1. The method of compounding fuels which comprises adding to commercial gasoline a small quantity of water soluble alcohol, placing the same in a closed retort, applying heat thereto to produce a pressure of twenty-five pounds to the square inch, more or less, then cooling to substantially normal atmospheric temperature and pressure, and then decanting the mixed alcohol and hydrocarbon.

2. The method of compounding fuels which comprises adding to commercial gasoline a small quantity of ethyl alcohol, placing the same in a closed retort, applying heat thereto to produce a pressure of twenty-five pounds to the square inch, more or less, then cooling to substantially normal atmospheric temperature and pressure, and then decanting the mixed alcohol and hydrocarbon.

3. The method of compounding fuels which comprises adding to commercial gasoline about five per cent of commercial ethyl alcohol, placing the same in a closed retort, applying heat thereto to produce a pressure of twenty-five pounds per square inch, more or less, then cooling to substantially normal atmospheric temperature and pressure, and then decanting the mixed alcohol and hydrocarbon.

Signed this 4th day of August, 1925.

GRANT HAMMOND.